March 6, 1973
R. K. GRASSELLI ET AL
3,719,528
FUEL CELL CONTAINING AN ELECTROLYTE CONSISTING OF
AN AQUEOUS SOLUTION OF ARSENIC ACID
Original Filed May 26, 1967
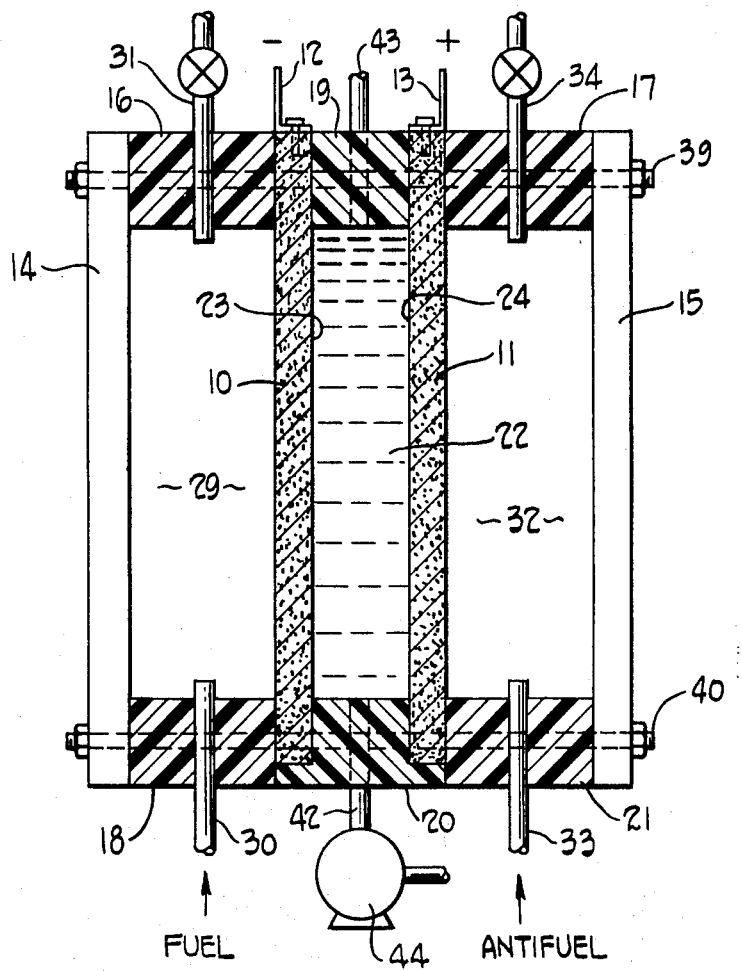
INVENTORS.
ROBERT K. GRASSELLI
BY JAMES L. CALLAHAN
Schramm, Kramer & Sturges
ATTORNEYS.

United States Patent Office 3,719,528
Patented Mar. 6, 1973

3,719,528
FUEL CELL CONTAINING AN ELECTROLYTE CONSISTING OF AN AQUEOUS SOLUTION OF ARSENIC ACID
Robert K. Grasselli, Cleveland, and James L. Callahan, Bedford, Ohio, assignors to The Standard Oil Company, Cleveland, Ohio
Continuation of application Ser. No. 659,827, May 26, 1967, which is a continuation-in-part of application Ser. No. 144,647, Oct. 12, 1961, both now abandoned. This application Oct. 12, 1970, Ser. No. 80,143
Int. Cl. H01m 27/00
U.S. Cl. 136—86 R                5 Claims

ABSTRACT OF THE DISCLOSURE

Improved ion-containing and conducting medium for electrochemical reaction apparatus comprising phosphoric acid and/or arsenic acid and water.

The principles of this invention, for exemplary purposes, will be described in reference to a fuel cell for directly converting chemical energy into electrical energy, it being understood, however, that these principles are applicable to other types of electrochemical reaction apparatus as well.

---

The present application is a continuation of copending United States application Serial No. 659,827, filed on May 29, 1967 which in turn is a continuation-in-part of United States application Serial No. 144,647 copending therewith and filed October 12, 1961 (now abandoned).

BACKGROUND OF THE INVENTION

The direct conversion of chemical energy into electrical energy may be accomplished by causing chemical reactions to take place between reactive materials at the junctures between spaced electron conductors and an intermediately disposed ion transfer medium to form a continuous energy exchange system. The reactive materials are separately supplied to each juncture so that the charge exchange of the reaction takes place ionically through the ion transfer medium forming an internal circuit, and electronically through the electron conductor forming an external circuit. Thus, where the reactive materials are continuously supplied and an electrical load is coupled to the external circuit, it is possible to electrochemically convert the energy of chemical reaction directly into electrical energy in the external circuit.

By way of example, when hydrogen is employed as one of the materials and oxygen as the other, oxidation and reduction of each of these materials at the corresponding junctures between the electronic and ionic conductors generates electrical energy in the external circuit and produces water as a product of the reaction. When each of the materials is continuously supplied and consumed within such apparatus, they may be likened, respectively, to a fuel and to an antifuel, the former of which is selected to yield electrons in its electrochemical reaction and the latter of which is selected to accept electrons.

Normally, in any such apparatus, the fuel and the antifuel are supplied in a relatively stable condition and some means is required for activating their conversion from their normally stable reactant state to their reaction product state. It is believed that such conversion of the fuel and antifuel takes place by means of chemical adsorption to a chemisorbed state, and desorption to the reaction product state at the corresponding junctures between the electrodes and the ion conductors. Such conversion of the fuel and antifuel is not self-motivating and is, therefore, preferably enhanced by the introduction of some means which will promote adsorption at each juncture and some ionic means in the ion transfer medium which will promote desorption at each juncture. The reaction products may be removed from the apparatus in any convenient manner and preferably as they are formed.

For the purpose of this description, the apparatus for accomplishing the direct conversion of chemical energy to electrical energy will be exemplified by a fuel cell. The electron conductors will be identified as electrodes and more specifically as the anode and cathode, respectively, depending on whether they are on the fuel or antifuel side of the cell.

The fuel will be identified throughout as any substance which is oxidizable relative to the antifuel which will in turn be identified as any substance which is reducible relative to the fuel; where oxidation and reduction, respectively, contemplate the release and acceptance of electrons.

A medium which is capable of conducting an electrical charge associated with an atom or a group of atoms, i.e., ions, will be referred to as an ion transfer medium. The ion transfer medium serves to isolate the electronic conductors from each other in the internal circuit. The junctures between the electrodes and the ion transfer medium will be identified throughout as interfaces. The activating means for promoting the conversion of the fuel and antifuel from their reactant state through the chemisorbed state to the reaction product state will be more specifically identified in conjunction with their functional coaction in the cell as an adsorber and a desorber. This overall reaction will be referred to as an electrochemical reaction.

DESCRIPTION OF THE INVENTION

The present invention is primarily concerned with an electrochemical reaction apparatus which is characterized by an ion-containing and conducting medium comprising phosphoric acid and water or arsenic acid and water or mixtures thereof. These ion containing and conducting media can be chemisorbed upon the surface of inert carrier matrices, for example, silica gel, porous ceramic matrix material, various clay supports, filter paper, fiber glass, etc. These materials are inert to oxidation and/or reduction within the cell which would otherwise impair the efficiency of the cell and are stable under the conditions of the cell. The hydrogen ion is the charge carrier in any case.

The fuel cells produced in accordance with the teachings of the present invention are simple and compact, and operable over a wide temperature range. In aqueous solutions of phosphoric or arsenic acid, the temperature is limited, of course, by the boiling point of the ion-containing and conducting medium under the conditions of operation of the cell. The cells may be operated at atmospheric, subatmospheric, and superatmospheric pressures depending upon the environment of use.

It has been found that there unexpectedly occurs a sharp maximum in current density in a fuel cell employing phosphate or arsenate chemisorbed on silica gel in the temperature range bewteen 180° and 250° C. This maximum in current density coincides with a minimum in the ohmic resistance across the fuel cell. It is of interest to note that this temperature range coincides with the transition temperature of the ortho to the pyro acid form. It is believed that under these conditions an unusually high acidity is obtained within the ion-containing and conducting medium which manifests itself in high protonic transport and hence low ohmic resistance and high current density.

Ion transfer media of the type wherein the phosphate or arsenate ion yielding material is chemisorbed upon an inert carrier such as alumina, silica gel, silica, silica-alumina, or other suitable support or immobile in the sense that the activator ions contained therein are held stationary on the surface of the support matrix while the moving hydrogen ions are easily moved therethrough. Such composite media permit compact cell design, prevent dilution of the medium by reaction products, and lessen water-proofing problems attendant to aqueous media. Conventional organic membranes are sensitive to elevated temperatures above 60° C.

Briefly stated, then, the present invention is in an electrochemical reaction apparatus having a pair of spaced electron conducting members, respectively adapted for connection to an external circuit. Disposed between the electron conducting members and forming reactive interfaces therewith and providing an internal circuit, is an ion-containing and conducting medium comprising phosphoric acid and/or arsenic acid and water. As indicated above, the phosphoric acid and/or arsenic acid and water may be chemisorbed on a support member to provide a solid ion-containing and conducting medium, or the ions may be derived from solutions of said acids.

A preferred embodiment of a method and apparatus for carrying out this invention will be hereinafter more particularly described in conjunction with the accompanying drawing in which:

The annexed drawing is a schematic illustration of an apparatus in accordance with the present invention.

With reference to the drawing, there is here shown in diagrammatic form a fuel electrode 10 and an antifuel electrode 11 in insulated spaced relation. Electrodes 10 and 11 are provided with terminals 12 and 13 which are adapted to be connected to an external circuit to complete the electron conducting portion of the apparatus. The external circuit is conventional and therefore not shown. End plates 14 and 15 are provided to close off the ends of the unit cell shown in the drawing. In multiple assemblies of unit cells, the cells may be stacked in such a way that end plates will be provided only at the ends of a horizontally repeating series of cell units. End plates 14 and 15 may be fabricated of metal, impervious graphite, ceramic or plastic materials provided the material selected is chemically inert toward the fuel or antifuel materials utilized in the adjacent chambers. In addition, if the end plates are fabricated from an electrically conducting material, suitable electrical insulating gaskets should be provided to insulate the end plates from electrically active components of the cell. Spacer members 16, 17, 18, 19, 20 and 21 are provided to maintain the proper spatial relationship between the respective end plates 14 and 15 and the electrodes 10 and 11. The spacers 16, 17, 18, 19, 20 and 21 may be fabricated of metal, impervious graphite, ceramic or plastic materials. The material of construction of such spacers should not react chemically with the fuel or antifuel or the ion transfer medium, and the provision should be made for electrically insulating the spacers from the adjacent electrode in the event that an electrically conducting material such as metal is selected.

Both the fuel electrode 10 and the antifuel electrode 11 may be fabricated of any porous electrically conducting material which is inert to chemical attack by the reactants and the ion transfer medium. Electrodes fabricated of porous carbon have been found satisfactory and quite inexpensive. While porous carbon as such may be employed as the electrode, it has been found desirable to further enhance the electrochemical activity by providing electrodes of porous metal such as porous sintered nickel, or the interspersion of a metal, e.g., platinum, or metal oxide, e.g., vanadium pentoxide adsorption activator on the surface of a porous carbon electrode. Such solid activators are believed to enhance adsorption of the fuel or antifuel prerequisite to chemisorption and desorption at the respective electrode reaction interfaces.

Disposed between electrodes 10 and 11 and electronically insulating such electrodes is an ion transfer medium 22 which includes ions. In accordance with this invention, in the specific embodiment shown in the drawing the medium 22 is desirably an aqueous 99 percent phosphoric acid solution. In place of phosphoric acid solution, arsenic acid solution may be used. This ion-containing and conducting medium may be supplied as a free fluid within the chamber intermediate electrodes 10 and 11, or supported on a porous matrix such as a porous clay matrix. The ion transfer medium 22 forms reactive interfaces 23 and 24 respectively with the electrodes 10 and 11. The fuel subsystem which is an example of a relatively reducible subsystem, includes the fuel reservoir 29, the fuel electrode 10 and the interface 23. The antifuel subsystem, which is an example of a relatively oxidizable subsystem, includes the antifuel reservoir 32, the antifuel electrode 11 and the interface 24.

The chamber 29 defined by the end plate 14 and the fuel electrode 10 and marginally enclosed by spacers 16, 18 and 20 is adapted to receive a fuel, for example, hydrogen containing fuel, e.g., ethane, propane, butane, ethyl alcohol, isopropyl alcohol, etc. The fuel containing material may be circulated through the inlet 30 and the outlet 31 may be provided with valve means for regulating the rate of flow of material through the fuel chamber.

The antifuel side of the cell is similarly provided with an antifuel chamber 32 having an inlet 33 and an outlet 34 in spacers 21 and 17, respectively, which spacers together with 20 marginally enclose the chamber 32. Specific examples of antifuels include the halogens, oxygen; for example, oxygen contained in air. A preferred fuel-antifuel couple is hydrogen-air.

The products of electrochemical reaction are under most circumstances soluble in the aqueous ion-containing and conducting medium 22. For example, when the fuel is hydrogen and the antifuel is air, the principal product of reaction is water which serves to dilute the phosphoric acid or arsenic acid ion-containing and conducting medium. When, however, phosphoric acid and/or arsenic acid and water is chemisorbed in concentrated form on an inert matrix such as silica gel, the by-products of the electrochemical reaction do not significantly dilute the ion-containing and conducting medium and are exhausted from the system through suitable means such as the exit 43. Where the ion-containing and conducting medium 22 is a comparatively dilute aqueous medium, at the outset the medium may be removed also through the outlet 43 and by means of conventional thermal of vacuum stripping operation, the reaction product may be stripped from the medium which is returned through the pump 44 and the inlet 42 to the space between the electrodes 10 and 11.

An aqueous solution of phosphoric acid, up to 99 percent $H_3PO_4$, is employed directly as the electrolyte between the appropriate fuel and antifuel electrodes. Water or minute amounts of moisture provide a part or all of the ion transfer medium. "Water" is used herein to mean occluded water, water of crystalization, hydrated water and the like. The ion transfer medium which is less than 100 percent ionized enables the transfer of a charge from one electrode surface interface to another electrode interface. The ion which is the principal charge carrier in the internal circuit is the hydrogen ion. Charge transfer from the fuel to the antifuel is by the well known Grotthuss type effect. An aqueous solution of arsenic acid may also be employed directly as the electrolyte between the electrodes. Filter, paper, cloth, fiberglass cloth, etc. may be impregnated with concentrated or dilute phosphoric acid and/or arsenic acid and used as the electrolyte. In still another embodiment of the present invention, these activator ions may be supplied from matrices such as silica gel, alumina, silica-alumina, and the like wherein the phosphoric acid and/or arsenic acid and water appear to be chemisorbed on the surface of the supporting matrix.

When thus provided in an electrochemical reaction apparatus, the phosphoric acid and water appear to coact in an unexpected manner with a hydrogen-containing fuel for the purpose of transporting hydrogen ions from the fuel electrode to the antifuel electrode for reaction therewith to complete the formation of the electrochemical reaction product of the cell. With the formation of the electrochemical reaction product, electrical energy is produced in the external circuit and is available for utilization thereat.

Where the phosphoric acid and/or arsenic acid and water is supported on a porous matrix, the electrodes may be plated directly on the impregnated support from both sides by any appropriate means such as vapor plating, high voltage sputtering, use of a metallizing gun or plasmatron, etc. Alternatively, the suport may be metal plated from one side prior to impregnation with the ion producing materials, and then two of the plated laminae fastened together in such manner that the unplated sides face each other. There results a very compact fuel cell where the electrodes are separated from each other only by the thickness of the supporting material for the ion producing material.

An inorganic gel, such as, silica gel,, alumina gel, etc. may be impregnated with phosphoric acid and water or arsenic acid and water, or the phosphoric acid and water or arsenic acid and water may be co-gelled with an inorganic gel and the resulting material used as the ion-containing and conducting medium. Here again, the electrodes may be plated directly on the two sides of the gel resulting in a very compact fuel cell.

A gelled electrolyte of the type just described composed of phosphoric acid and water applied onto a ceramic support may be used to temperatures up to 400° F. or higher. At temperatures above 200° C. the phosphoric acid is in a polymeric state and chemisorbed to the supporting matrix. Only protons or other positive ions will move in this instance along the polymeric acid from the negative to the positive pole of the fuel cell. This type of electrochemical reaction apparatus is of particular value because at the higher temperatures, the electrodes which serve as the catalysts for the electrochemical reactions show higher activity. Accordingly, a wide range of electrochemical reactants may be used in this type of cell.

As electrodes, any heavy metals, oxides of heavy metals, carbon, or other suitable materials capable of catalyzing the electrochemical reaction may be employed. The cell may be operated on hydrogen, hydrocarbons, partially oxygenated hydrocarbons, or any other suitable fuel or antifuel. Water or steam may be used along with the fuel on the fuel side of the cell, particularly in those cases where the fuel is other than hydrogen.

Preliminary results show that a fuel cell employing phosphoric acid and water impregnated on silica gel with platinum electrodes plated directly onto the gel from both sides produces currents of 0.5 to 1 milliampere per $cm.^2$ at a voltage of about 0.7 volt when hydrogen is used as the fuel, and oxygen is used as the antifuel. In this cell, the electrodes are separated by about 5 to 8 mm. and contain only a small amount of phosphoric acid and water. By bringing the electrodes closer together, i.e., to within a few microns, and increasing the phosphoric acid content, higher current densities may be obtained.

What is claimed is:

1. A fuel cell comprising a pair of spaced electron conducting members, and disposed therebetween and forming reactive interfaces therewith, respectively, a hydrogen ion-containing and conducting medium consisting of an aqueous solution of arsenic acid.

2. The fuel cell of claim 1 wherein said medium is supported on an electrolyte insoluble matrix.

3. The fuel cell of claim 1 wherein said matrix is alumina.

4. The fuel cell of claim 2 wherein said matrix is silica.

5. The fuel cell of claim 2 wherein said matrix is silica-alumina.

References Cited

UNITED STATES PATENTS

| | | | |
|---|---|---|---|
| 2,901,524 | 8/1959 | Gorin | 136—86 |
| 2,913,511 | 11/1959 | Grubb | 136—86 |
| 2,921,111 | 1/1960 | Crowley et al. | 136—86 |
| 3,056,647 | 10/1962 | Amphlett | 136—86 X |
| 3,116,170 | 12/1963 | Williams et al. | 136—86 |
| 3,244,564 | 4/1966 | Fox | 136—86 |
| 3,255,045 | 6/1966 | Powers et al. | 136—86 |

WINSTON A. DOUGLAS, Primary Examiner

H. A. FEELEY, Assistant Examiner

U.S. Cl. X.R.

136—154